United States Patent [19]
Domnick

[11] 3,805,277
[45] Apr. 16, 1974

[54] STILL PICTURE CAMERA HAVING TWO FILM CASSETTES

[76] Inventor: Hans Domnick, Bismarckstrasse 69, 1 Berlin 39, Germany

[22] Filed: Nov. 6, 1972

[21] Appl. No.: 303,983

[30] Foreign Application Priority Data
Dec. 2, 1971 Germany............................ 2159858

[52] U.S. Cl.................................. 354/21, 242/71.1
[51] Int. Cl. ........................................... G03b 19/06
[58] Field of Search.................................. 95/31, 11

[56] References Cited
UNITED STATES PATENTS
| | | | |
|---|---|---|---|
| 2,245,606 | 6/1941 | Rauch..................................... | 95/31 |
| 2,546,540 | 3/1951 | Gruben................................... | 95/31 |
| 2,616,342 | 11/1952 | Thompson.............................. | 95/31 |

FOREIGN PATENTS OR APPLICATIONS
| | | | |
|---|---|---|---|
| 980,661 | 1/1965 | Great Britain.......................... | 95/31 |

Primary Examiner—John M. Horan

[57] ABSTRACT

A still picture camera is equipped with two cassettes releasably mounted in the camera housing on either side of the lens and pressure plate. The body portion of each cassette holds a supply spool for a roll of film, and the take-up spool is mounted in an insert position normally set in an opening of the body portion. When the cassette is received in the camera housing, the insert portion is automatically released from the body portion and coupled to an operating mechanism in the camera housing which moves the insert portion across the back of the housing, and thereby places a frame of film on the pressure plate. Provisions are made for advancing the film by one frame from the supply spool to the take-up spool during each reciprocating cycle of the insert portion. A film sensitivity setting on the cassette is automatically connected to the automatic exposure control of the camera when the insert portion is withdrawn by the operating mechanism. Thus, respective frames of two films may be exposed alternatingly or cassettes carrying yet additional films may be substituted quickly for providing a wide choice of film types and speeds in consecutively exposed pictures without loss of unexposed film or risk of double exposure.

20 Claims, 12 Drawing Figures

STILL PICTURE CAMERA HAVING TWO FILM CASSETTES

This invention relates to cameras, and particularly to a still picture camera equipped with two film cassettes holding respective rolls of films.

It is known from German Pat. No. 1,146,743 to equip a still picture camera with devices which permit two rolls of film to be held in the camera housing simultaneously, and frames from either roll to be exposed consecutively. However, the films in the known camera cannot be removed until they are fully exposed if the unexposed portions are not to be sacrificed.

One of the primary objects of this invention is the provision of a camera which permits sequential exposures to be made on as many types of film as may be desired without loss of unexposed frames or danger of double exposure.

Another object is the provision of a film cassette capable of being inserted into and withdrawn from the camera while protecting unexposed film or unexposed frames of a film against ambient light. In one of its more specific aspects, the invention aims at a combination of camera and cassette, in which mere insertion of a cassette into the camera body makes the assembly ready for exposure of the film in the cassette at a shutter speed or diaphragm setting controlled by the automatic exposure control of the camera.

With these and other objects in view, the camera of the invention has a housing in which two open receptacles are offset from the pressure plate in opposite directions. Two cassettes are releasably received in the receptacles and each includes a body portion and an insert portion releasably secured to the body portion. First and second film spools are rotatable in respective portions of each cassette, and respective end portions of a film are secured to the spools. Movement of the film between the spools is suitably guided. As operating mechanism of the camera alternatively withdraws the insert portions from the body portions and moves the withdrawn insert portions past the pressure plate toward the receptacle receiving the other cassette, thereby placing a frame of the film on the pressure plate for exposure to light entering the camera housing through an objective lens suitably mounted on the housing.

For use in the afore-mentioned camera, the invention provides a cassette which has a body portion provided with an opening. An insert portion having an open side is shaped for being received in the opening in a sealing position in which the insert portion seals the opening against entry of light into the interior of the body portion, and the open side of the insert portion is in the interior of the body portion and thereby sealed against entry of light into the insert portion. Mountings in each portion may hold respective film spools for rotation about axes which extend in a common direction when the insert portion is received in the opening of the body portion. A wall of the body portion is movable to give access to the interior of the body portion for insertion of a film spool.

Other features, additional objects, and many of the attendant advantages of this invention will readily be appreciated as the same becomes better understood by reference to the following detailed description of a preferred embodiment of the invention when considered in connection with the appended drawings in which all figures are perspective views unless specifically stated otherwise.

Figure 1:
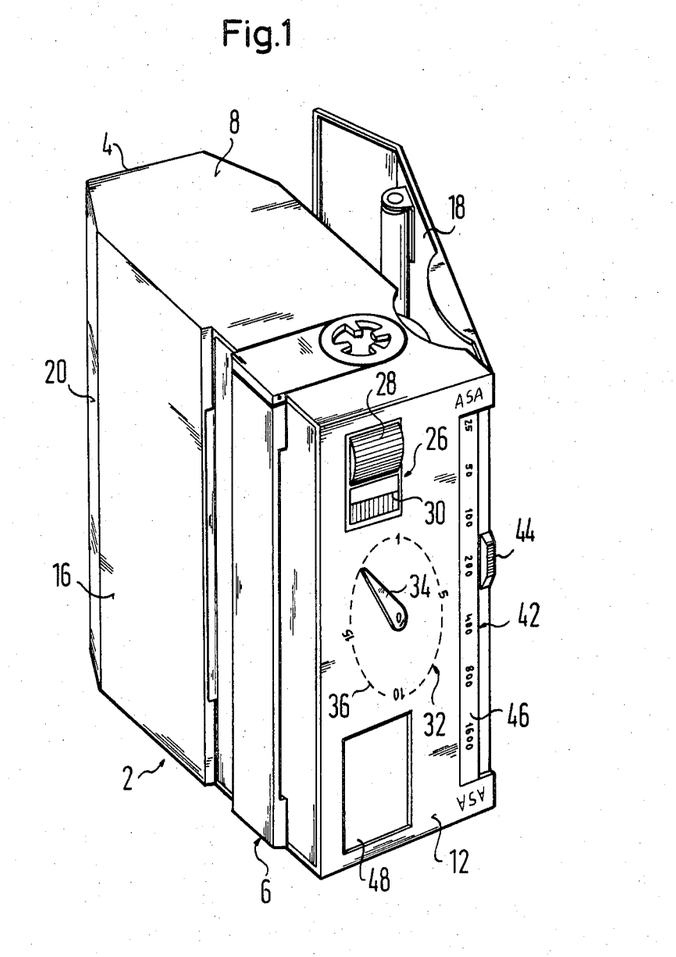
FIG. 1 shows a film cassette of the invention, a cover of the cassette being ajar.

Referring now to the drawing in detail, and initially to FIG. 1, there is seen a film cassette 2 of the invention whose principal visible elements are a body 4 and an insert 6. The body 4 has the approximate shape of a flat box standing on one of its narrow sides as viewed in FIG. 1, which shows the position of the cassette when installed in a camera. The narrow sides of the body 4 are formed by a top wall 8, a rear wall 12, a bottom wall 10, and a front wall 14, the walls 10, 14 being obscured in FIG. 1, but seen in FIG. 2. The wide sides of the body 8 are mainly formed by an upright side wall 16 and a light-tight cover 18 hinged to the rear wall 12.

Figure 2:
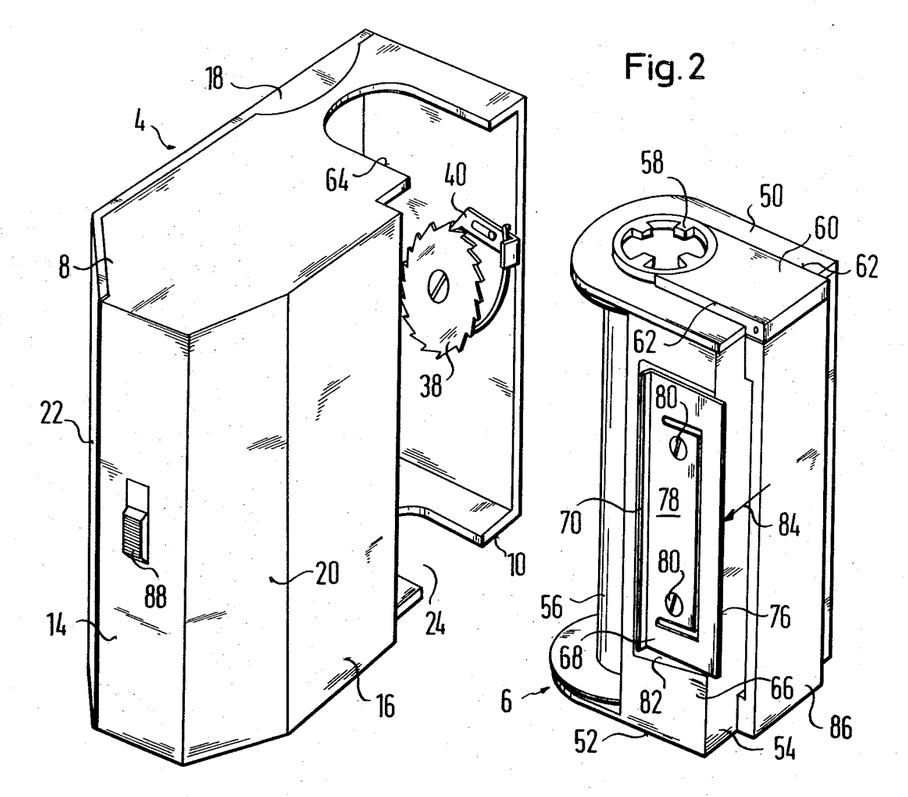
FIG. 2 shows the two disengaged principal elements of the cassette of FIG. 1.

As is better seen in FIG. 2, the body 4 tapers toward the front wall 14 by a bevel 20 in the side wall 16 and an obliquely offset free edge portion 22 of the cover 18. Openings 24 in the walls 8, 10, 16 conformingly receive the insert 6 in the assembled condition of the cassette in light-tight engagement.

Reverting to FIG. 1, there is seen a manually adjustable indicator 26 on the rear wall 12 of the cassette body 4. It essentially consists of a knurled slide 28 vertically movable on the wall 12 to cover or to reveal differently colored sections of a plate 30 and thereby to indicate the type of film contained in the cassette 2.

The rear wall 12 further carries a film frame counter 32. A pointer 34 sweeps a circular scale 36 of numerical indicia to indicate how many frames of the film contained in the cassette 2 have been exposed. The shaft carrying the pointer 34 on the outer face of the rear wall 12 is fixedly attached to a ratchet wheel 38 (FIG. 2) on the inner face of the wall. A pawl 40 slidably mounted on the inner wall face and spring-biased toward the illustrated position turns the wheel 38 by one tooth spacing corresponding to one unit of the scale 36 during each cycle of insert movement when the insert 6 enters the openings 24, and friction between the wall 12 and the shaft of the counter 32 prevents the ratchet from being turned back when the pawl returns to the illustrated position upon withdrawal of the insert 6 from the openings 24.

The outer face of the rear wall 12 also carries elements of a mechanism 42 for adjusting the automatic exposure circuit of a camera associated with the illustrated cassette for the light sensitivity of the film held in the cassette. The visible elements consist of a metal knob 44 and a scale 46 calibrated in ASA units. The knob can be moved along the scale 46. A recessed portion 48 of the rear wall may receive pencil inscriptions further to identify the film in the cassette.

As is best seen in FIG. 2, the insert 6 has a top wall 50, a bottom wall 52, and a side wall 54. A film take-up spool 56 is held between the top and bottom walls 50, 52 by stub shafts, as is conventional and not explicitly shown in the drawing. The upper shaft and the spool 56 secured thereto may be turned by means of an internally toothed wheel 58 on the top wall 50. The wheel 58 and a raised portion 60 of the top wall 50 precisely fit into the corresponding opening 24 of the body 4 so that a seal is formed between the edges 62 of the wall portion 60 and of the wheel 58 and the rim 64 of the top wall 8 on the cassette body when the insert 6 is in its operative position. Entry of light into the interior of the body 4 is prevented by the insert 6 whose open side is located in the interior of the body and sealed there against external light.

The top and bottom walls 50, 52 of the insert 6 are connected by a front wall 66 formed with a shallow recess 82. A leaf spring 68 of vertically elongated, generally rectangular shape is attached to the front wall 66 in the recess 82 by two screws 80 passing through the central portion 78 of the spring 68 which is separated by a slot on three sides from the peripheral spring portion. One longitudinal edge portion 70 of the spring 68 is offset at right angles so as normally to project from the recess 82. The other longitudinal edge portion 76 projects beyond the side wall 54 of the insert 6 and serves as an insert release. Pressure exerted on the edge portion 76 in the forward direction indicated by the arrow 84 causes the edge portion 70 to be retracted into the recess 82. A strap 86 fixedly attached to the side wall 54 and the latter bound a laterally narrow, high guide passage toward the edge portion 76, the purpose of which will presently become apparent.

A button 88 on the front wall 14 of the cassette body 4 operates a lock for the cover 18. In the partly open position seen in FIG. 3, the cover 18 reveals a partition 72 which partly separates a front compartment 90 in the cassette body 4 from a rear compartment 92 which receives the insert 6. In the fully inserted, illustrated position of the insert 6, the edge portion 70 of the spring 68 engages the free side edge 74 of the partition 72 and thereby prevents withdrawal of the insert 6.

Figure 3:
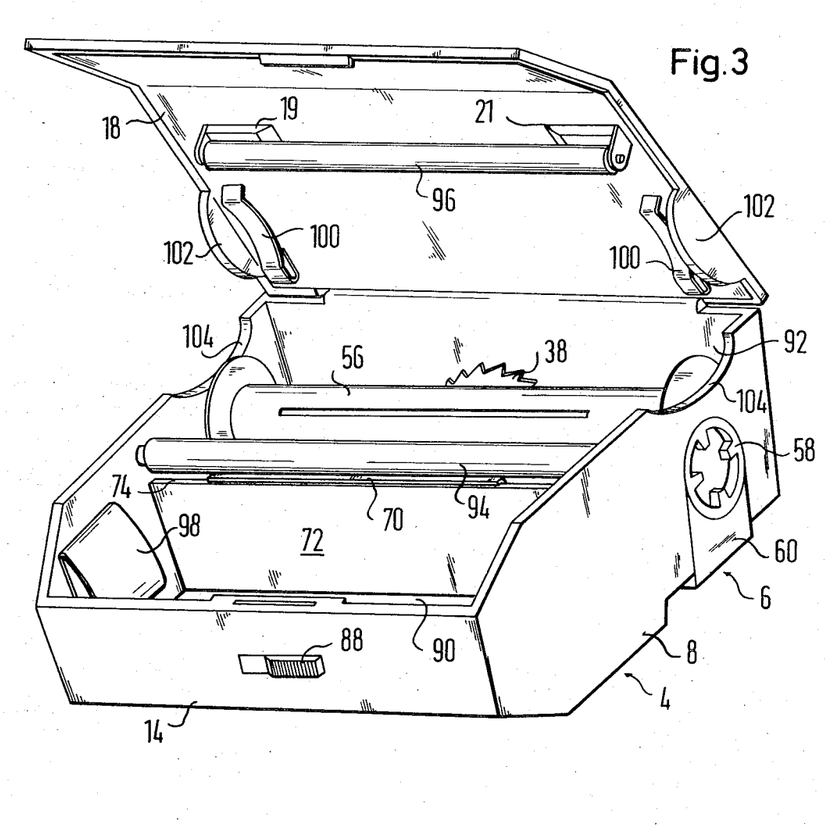
FIG. 3 illustrates the cassette with its cover partly open.

A roller 94 is rotatably mounted between the walls 8, 10 of the cassette body 4 for rotation about a normally upright axis in the plane of the partition 72 and cooperates in the closed cassette with a parallel, corresponding roller 96 on the cover 18 to guide film between the compartment 90 and the film take-up spool 56. The two ends of the roller 96 are journaled in brackets on receptacles 19, 21 which are open in an outward direction, and whose functions will presently be described.

Figure 4:
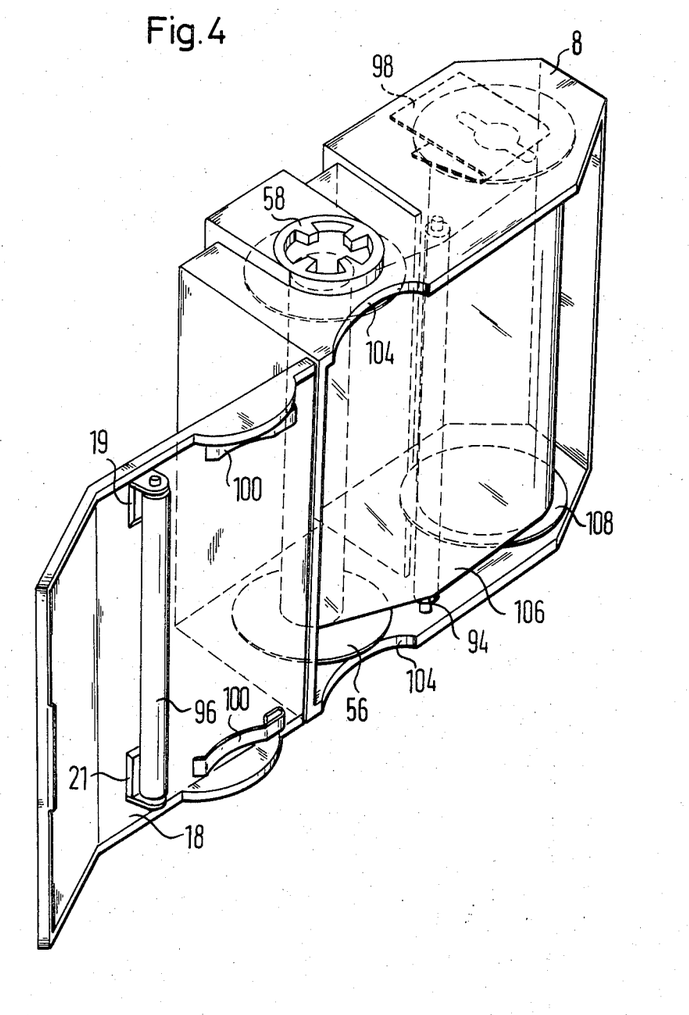
FIG. 4 shows the cassette with fully opened cover.

Folded leaf springs 98 on the top and bottom walls 8, 10 of the cassette body 4 in the compartment 90 normally hold a film supply spool 108, as is shown in FIG. 4. Leaf springs 100 on the cover 18 are shaped to engage the edge portions of film wound on the film take-up spool 56 and to hold the film taut. Approximately semi-circular flaps 102 on the top and bottom edges of the cover 18 seal conforming recesses 104 in the walls 8, 10 in the closed position of the cover 18. When the cover 18 is open, the recesses 104 facilitate removal of a film-carrying spool 56. As is evident from FIG. 4, the cassette is loaded by inserting a spool 108 carrying an unexposed film 106 into the front compartment of the cassette, inserting the free end of the film 106 in a slot of the film take-up spool 56, and turning the wheel 58 until the film 106 is secured on the take-up spool 56 in the usual manner.

Figure 5:
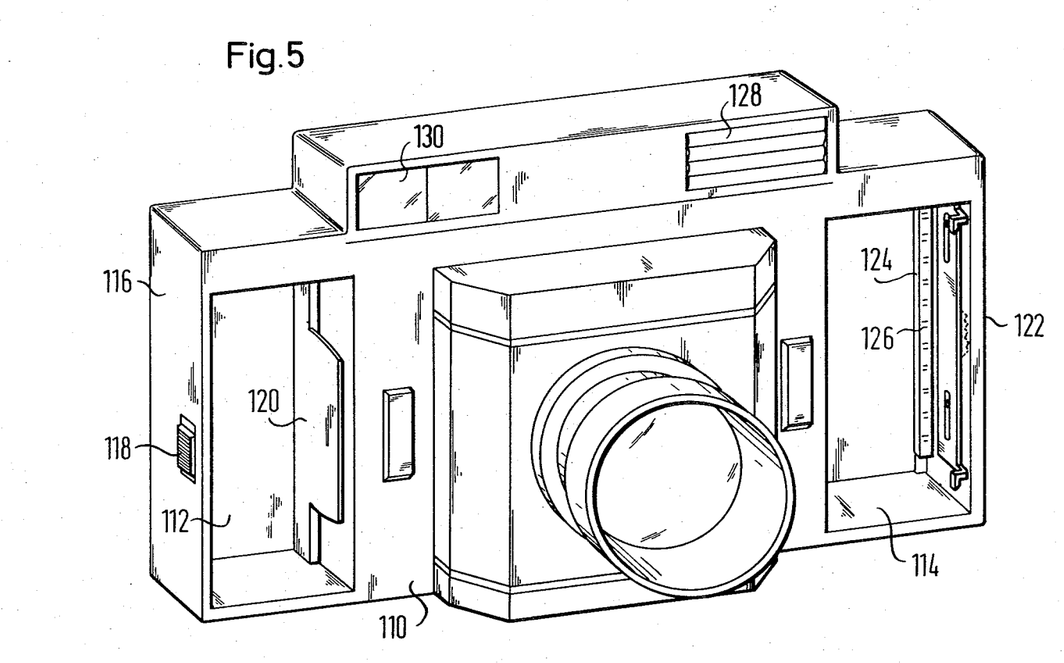
FIG. 5 shows a camera for use with two cassettes of the type shown in FIGS. 1 to 4.

The camera of the invention seen in FIG. 5 has a view and rangefinder 130 and a photoelectric cell 128. The camera body 110 differs from the usual appearance of a 35 mm viewfinder camera with automatic exposure control by two openings or receptacles 112, 114, which are open forward and backward where the film spools are held in a conventional camera on opposite sides of the objective lens and the pressure plate. The opening 112 is bouned by the right side wall 126 of the body 110. A knob 118 on the outer face of the wall 116 operates a lock for the cassette 2 when the cassette is inserted in the opening 112, as will be explained hereinbelow with reference to FIG. 11. A leaf spring 120 in the opening 112 enters the afore-mentioned guide passage between the side wall 54 and the strap 86 when the cassette 2 is moved rearward into the opening 112, thereby releasing the locking spring portion 70 from the partition 72 of the cassette body 4 and permitting withdrawal of the insert 6 from the cassette body.

The opening or receptacle 114 is bounded by the left side wall 122 of the camera body and is dimensioned and arranged for receiving a cassette which is the mirror image of the cassette described above with reference to FIGS. 1 to 4, and thus does not require separate description. As cannot be seen in FIG. 5, the outside of the side wall 122 carries the operating knob of another cassette lock, and a leaf spring corresponding to the spring 120 is arranged in the opening 114, but is concealed in the view of FIG. 5. A vertical bar 124 of insulating material in each of the openings 112, 114 carries pairs of contacts 126.

Figure 6:
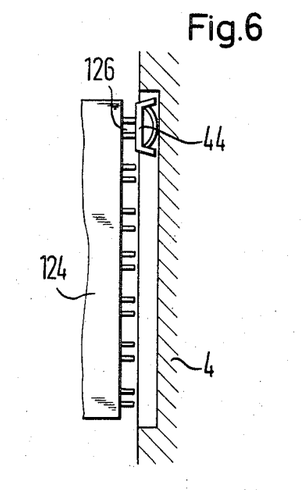
FIG. 6 illustrates the cooperation of the cassette with elements of an automatic exposure circuit in a fragmentary elevational view.

As is seen in FIG. 6, the metal knob 44 of a magazine body 4 inserted into either opening 112, 114 closes a circuit between respective pairs of contacts 116 in each of the knob positions indicated on the scale 46 (FIG. 1). The contacts 126 on each bar 124 are connected with taps on a non-illustrated resistor for short-circuiting portions of the resistor which may be inserted in the output circuit of the photoelectric cell 128 in a manner to vary the output signal of the cell at constant lighting conditions, and thereby to vary the exposure setting of the iris diaphragm (not shown) according to the film speed, as is conventional in itself in automatic exposure mechanisms. As will be shown in FIG. 11, a limit switch 132 inserts the tapped resistor associated with the operative magazine 2, 2' into the output circuit of the photoelectric cell 128.

Figure 7:
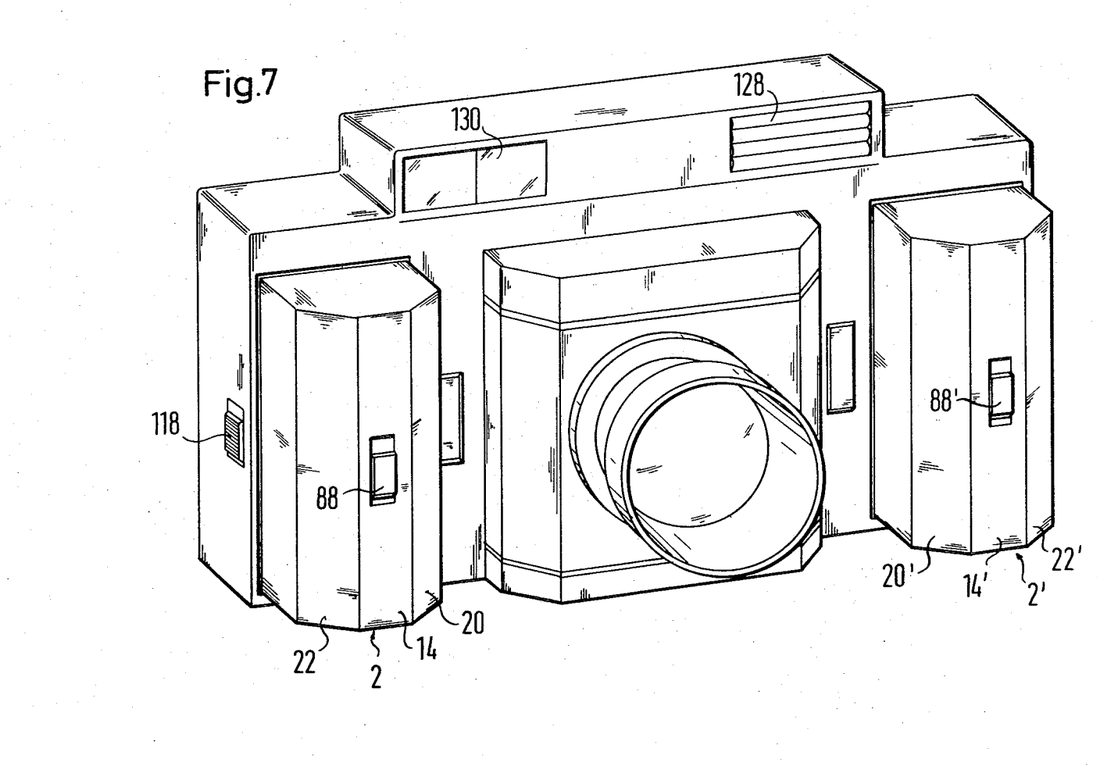
FIG. 7 shows the camera of FIG. 5 with two installed film cassettes.

FIG. 7 shows the camera of FIG. 5 loaded with two cassettes 2, 2', the cassette 2' being the mirror image of the cassette 2, as is evident from the relative position of the bevel 20' and the obliquely offset cover portion 22' adjacent the front wall 14' of the cassette 2' which carries a knob 88' for the cover of the cassette 2'. The cassettes seal the respective openings 112, 114 against entry of light.

Figure 8:
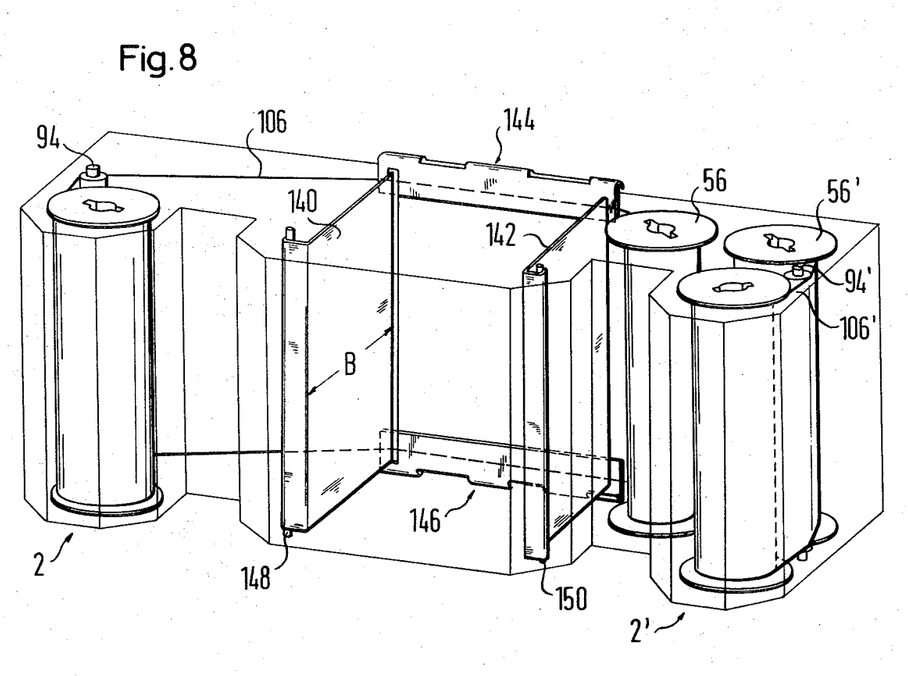
FIG. 8 illustrates internal elements of the camera of FIG. 7 which hold film during operation of the camera, the camera housing being shown in phantom view from the front.

Some internal elements of the camera of FIG. 7 are seen in FIG. 8. Only the body of the cassette 2 and the supply spool carrying unexposed film 106 are in the position assumed immediately after insertion of the cassette 2 into the camera body, the latter being shown in phantom view in FIG. 8. The associated insert has been shifted within the camera body by an operating mechanism presently to be explained so that the take-up spool 56 of the cassette 2 is located near the cassette 2', and the film 106 is trained over the roller 94 and obscures the pressure plate of the camera as the film extends along the camera back to the take-up spool 56. Both spools of the cassette 2' are in the inoperative position, the positions of the corresponding inserts being indicated by those of the take-up spools 56, 56' and the lengths of films 106, 106' which are visible on either side of the associated rollers 94, 94'.

Figure 9:
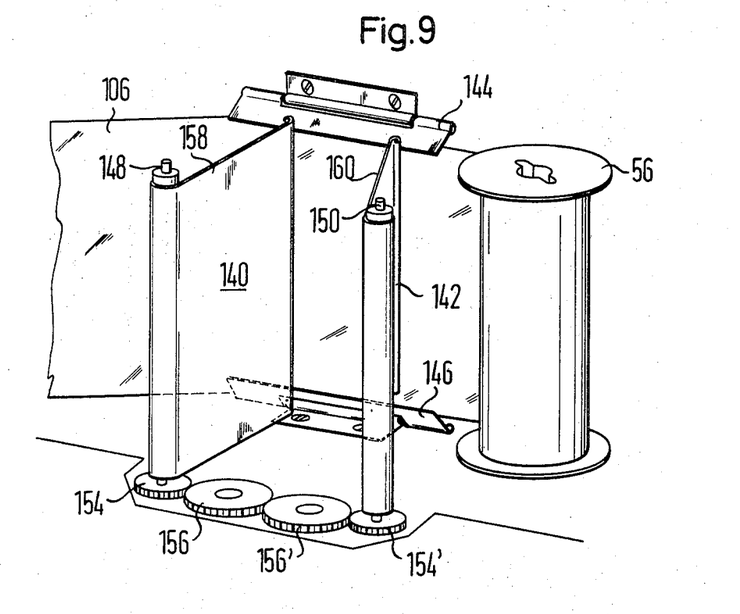
FIGS. 9 and 10 show elements of the device of FIG. 8 in different operating positions.
Figure 10:
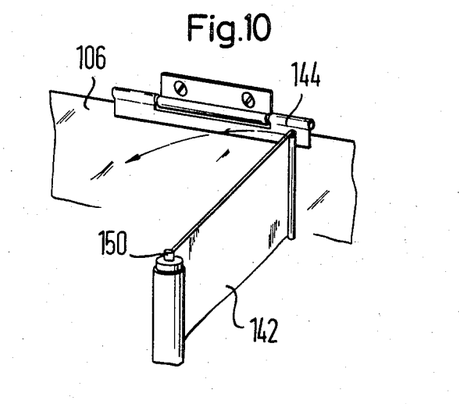

A frame of the film 106 during exposure is defined horizontally by two rectangular framing flaps 140, 142, and vertically by two horizontally elongated masking plates 144, 146. The flaps 140, 142 are mounted on vertical pivot shafts 148, 150 at the front of the camera. The flaps are biased toward the position shown in FIG. 8 by non-illustrated spiral springs, and the shafts 148, 150 are pivoted out of the position seen in FIG. 8 by the mechanism described below which shifted the pick-up spool 56 into the position shown in FIG. 8 to press the film 106 against the obscured pressure plate by means of the flaps 140, 142 when the spool 56 reaches its illustrated operative position, the width B of the flaps 140, 142 being selected to leave merely enough space for the film 106 and the masking plates 144, 146 at the rear of the camera body. The flaps 140, 142 are pivoted toward each other to open a wide path when the spool 56 is returned to the inoperative position in the cassette 2. The masking plates 144, 146 are operated by the moving flaps 140, 142 and by return springs, not explicitly shown, as is seen in FIGS. 9 and 10.

The shafts 148, 150 carry respective spur gears 154, 154' (FIG. 9) which are meshingly connected by two idler gears 156, 156' in such a manner that one shaft 148, 150 pivots clockwise when the other pivots counterclockwise. As the upper edge portions 158, 160 of the flaps 140, 142 approach the film 106, they engage the masking plate 144, and the masking plate 146 is similarly engaged by the lower edge portions of the flaps 140, 142. Ultimately, the vertical edges of the flaps 140, 142 and the horizontal free edges of the masking plates 144, 146 bound the frame of the film 106 that is to be exposed through the objective lens of the camera in a conventional manner. The operative positions of the flaps and masking plates are evident from FIG. 10. When the flaps 140, 142 pivot away from the masking plates 144, 146, the latter are returned to the position shown in FIG. 9 by respective springs, not shown, and the take-up spool 56 may be returned to the associated magazine body 4 through the gap opened thereby, as is not explicitly shown in FIGS. 9 and 10.

Figure 11:
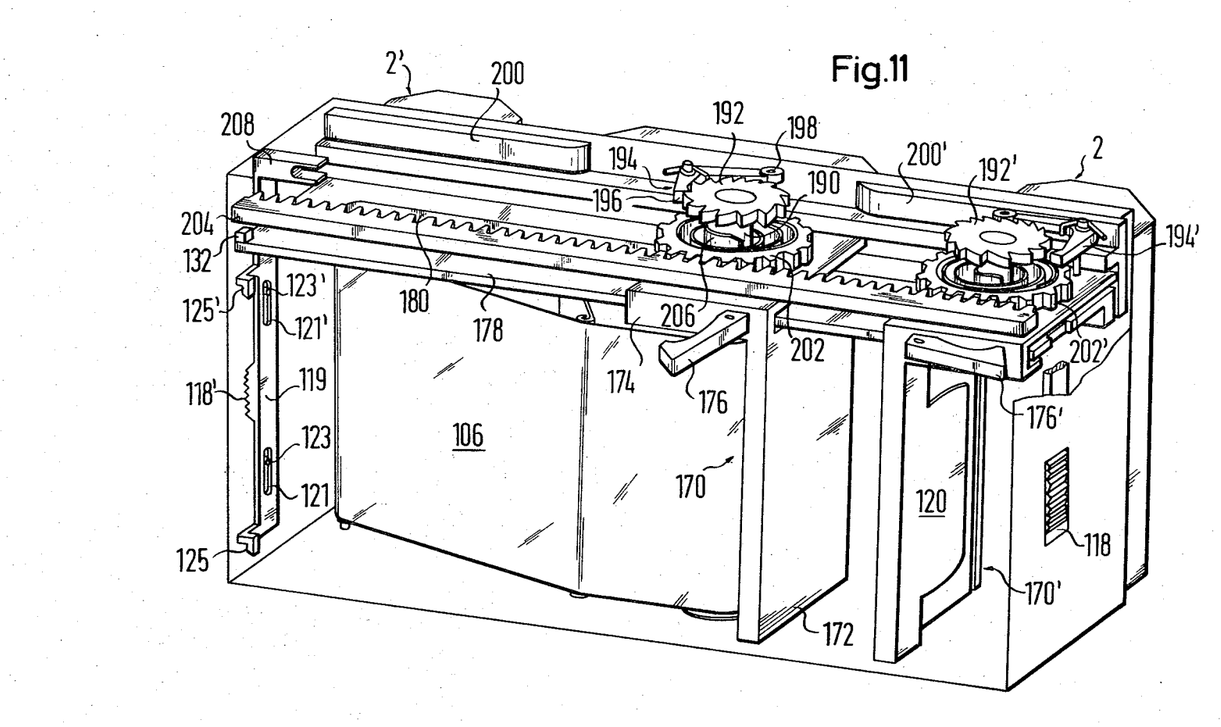
FIG. 11 illustrates the film advancing mechanism of the camera of FIG. 5 in a view similar to that of FIG. 8.

The mechanism which shifts the take-up spool 56 into the position illustrated in FIGS. 8 and 9 permits a corresponding displacement of the spool 56' as shown in FIG. 11 and will be described primarily with reference to the cassette 2' and associated elements, the corresponding mechanism for the cassette 2 being a mirror image of that described with exceptions that will be obvious. Portions of both cassettes have been omitted from FIG. 11 so as not to obscure the working elements more specifically described.

The spring 120 associated with the cassette 2' and obscured in FIG. 11 is mounted on a vertical plate 172 of an L-shaped slide 170, the shorter leg 174 of the slide providing a base plate attached to the top of the plate 172. A short operating arm 176 is pivoted to the base plate 174, extends through a slot in the back wall of the camera body 110, and thus permits the slide 170 to be moved manually. The slide 170 is guided by a flat, horizontal bar 178 which extends between the side walls 116, 122 of the camera body 110 and is provided with a longitudinal slot 180.

A shaft 190 is journaled in the base plate 174, and its lower end, not seen in the drawing, carries a key conformingly engaged in the internally toothed wheel 58 of the cassette 2'. The shaft 190 may be shifted axially in the base plate 174 for disengagement from the wheel 58. The top end of the shaft 190 carries a ratchet wheel 192. The wheel 192 may turn counterclockwise, as viewed in FIG. 11, at all times, but cannot turn clockwise when engaged by a detent 196 on one arm of a two-armed lever 194 spring-biased toward engagement with the wheel 192 and also mounted on the base plate 174. The other arm of the lever 194 carries a rounded cam follower 198 which is engaged by cams 200, 200' during the initial and final stages of movement of the slide 170 across the width of the camera body. The cams 200, 200' keep the detent 196 out of engagement with the ratchet wheel 192 except during movement of the slide 170 through the central portion of its path whose length is equal to the width of one frame on the film 106.

A spur gear 202 is frictionally secured on the shaft 190. In an actual embodiment of the invention, a simple friction clutch is interposed between the shaft 190 and the gear 202, but it may be assumed for the purpose of this description that the gear 202 is mounted on the shaft 190 by a friction fit. The gear 202 meshes with a rack 204 fixedly fastened to the camera body so that the shaft 190 is turned when the slide 170 is shifted by means of the arm 176. When the arm is pivoted against the rear face of the camera, it cammingly secures the slide 174 against movement along The bar 178. A central recess in the gear 202 receives a spiral spring 206 which connects the gear 202 to the shaft 190 and is tensioned when the gear 202 is turned by engagement with the rack 204 during movement of the insert 6 with the slide 170 outward of the cassette body while the shaft 190 is arrested by the detent 196 engaging the wheel 192.

While the insert 6 is moved outward of the cassette body 4 by the engaging spring 120 on the slide 170, the shaft 190 is at first free to rotate while the spool in the cassette body is braked by the folded leaf springs 98, and withdrawal of film is impeded by the cooperating rollers 94, 96. Initially, therefore, film is unwound from the spool 56 on the shaft 190 until the cam follower 198 leaves the cam 200, and the wheel 192 is arrested. A length of one frame of film is thereafter withdrawn from the cassette body while the slide 170 travels through the central portion of the camera body and engages one of the flaps 140, 142 to swing the flaps toward the operative position in which they hold the film fast while the slide 170 is in its terminal position remote from the cassette body.

After the film is exposed, the manually operated slide 170 returns the spool 56' and the entire insert 6 to the cassette body 4. During the return movement, the film is held taut by the spring 206 and the entire available length of film is wound on the spool 56'. The flaps 140, 142 are swung out of the path of the insert 6 by the slide 170.

The lock which retains the cassette 2' in the opening 114 includes a flat, vertical bar 119 which is guided on the side wall 122 in the opening 114 by two guide pins 123, 123' engaging slots 121, 121' of the bar 119. The bar carries hooks 125, 125' which engage the receptacles 19, 21 on the cover 18 of the cassette 2' (see FIGS. 3, 4). The top end of the bar 119 carries a fork 208. The fork receives the gear 202 when the insert 6 is returned to the cassette body 4 by the slide 170. When the cassette lock is opened by means of the knob 118' to permit withdrawal of the cassette 2' from the camera body, the fork raises the gear 202, the shaft 190, and the non-illustrated key at the bottom of the shaft, thereby releasing the internally toothed wheel 58. When the cassette 2' is locked in position after insertion in the camera body, the take-up spool 56 is automatically coupled to the shaft 190.

The mechanism for shifting the insert of the cassette 2 is partly seen in FIG. 11, and includes the leaf spring 120 on its carrier 170' which may be shifted along the guide bar 178 by means of an operating arm 176'. A shaft passing vertically through the slot 180 in the bar 178 carries a ratchet wheel 192' and a spur gear 202' meshing with the rack 204. The lever 194' cooperating with the ratchet wheel 192' is also shown. A more detailed description of these elements is not needed since they operate in the same manner as described above with reference to the cassette 2'.

A microswitch 132 is mounted on the bar 178 in a position in wich it is engaged by the slide 170 associated with the cassette 2' when the insert 6 of the cassette 2' is in the inoperative position. When engaged by the slide 170, the microswitch 132 inserts into the output circuit of the photoelectric cell 128 the variable resistor (not shown) whose resistance is determined by the position of the knob 44 on the cassette 2. In the condition of the apparatus shown in FIG. 11, the microswitch 132 is released and connects into the circuit of the cell 128 the variable resistor associated with the cassette 2', therefore setting the automatic exposure control of the camera, not shown in detail, for the sensitivity of the film about to be exposed and indicated on the scale 46 of the cassette 2' by the knob 44 which faces the photographer.

Figure 12:
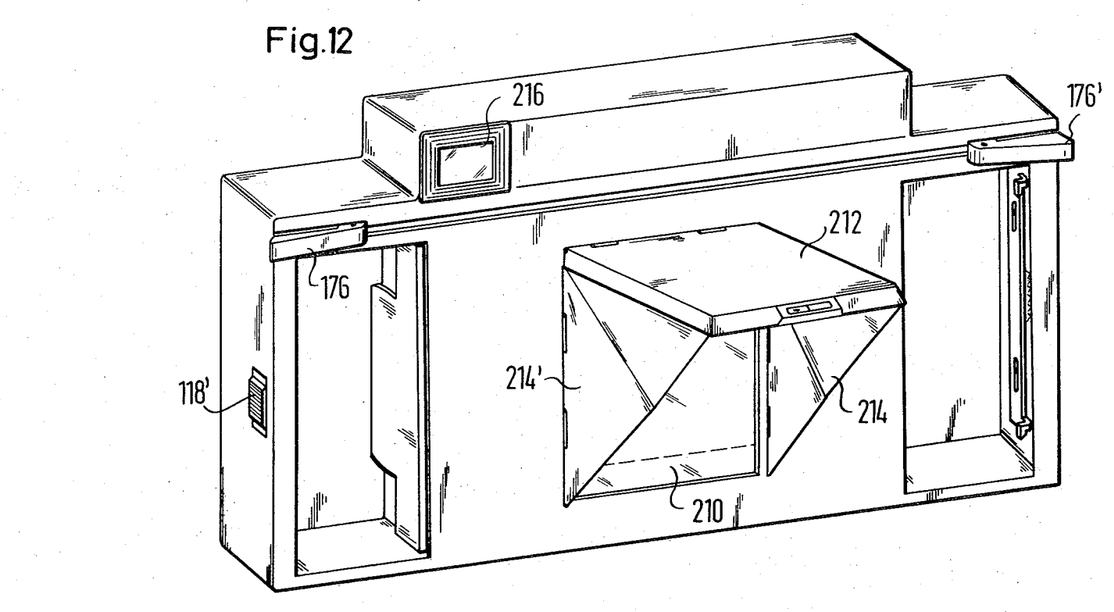
FIG. 12 is a rear view of the camera of FIG. 5.

FIG. 12 shows the back of the camera seen in FIG. 5 without its cassettes. A translucent ground glass 210, set in an opening of the back wall, simultaneously serves as pressure plate for the films 106, 106' which would be withdrawn into the respective cassettes if the cassettes were installed, both slides being retracted as indicated by the position of the associated operating arms 176, 176'. Before film is withdrawn from either cassette, the ground glass 210 is covered by a hinged, light-tight sealing plate 212 which provides a hood in the illustrated open position and is provided with folding sides 214, 214'. The ground glass may be used for critical focusing of the objective lens on the front wall of the camera housing while a viewfinder 216 may be used in a conventional manner when rapid action is called for.

What is claimed is:

1. In a still picture camera having a housing, a pressure plate in said housing adapted to back a frame of a light-sensitive film, and an objective lens mounted on said housing in a position to project an image on said frame, the improvement which comprises:
   a. means on said housing defining two open receptacles offset from said pressure plate in opposite directions;
   b. two cassettes releasably received in said receptacles respectively, each cassette including a body portion, an insert portion releasably secured to said body portion, and means on said body portion for sealing the receptacle in which said cassette is received against entry of light;
   c. first and second film spools respectively rotatable in said portions of each cassette and including means for securing respective end portions of said film to said spools;
   d. guide means for guiding movement of said film between said spools; and
   e. operating means for alternatively withdrawing said insert portions from said body portions and for moving the withdrawn insert portions past said pressure plate toward the receptacle receiving the other cassette and thereby placing a frame of said film on said pressure plate.

2. In a camera as set forth in claim 1, said housing having a front wall carrying said objective lens and a back wall, each receptacle being open through at least one of said walls.

3. In a camera as set forth in claim 1, first locking means for locking the body portion of each cassette in the associated receptacle, second locking means biased toward locking each insert portion in the associated body portion, and releasing means on said housing releasing said second locking means in response to said body portion being received in said associated receptacle.

4. In a camera as set forth in claim 3, said operating means including a slide movable on said body in a direction from one to the other one of said receptacles, and engaging means on said slide engaging said insert portion for movement of said insert portion with said slide, when said body portion is received in the associated receptacle.

5. In a camera as set forth in claim 4, said engaging means including an engaging member, and said insert portion being formed with an opening for receiving said engaging member, said releasing means including a releasing member moved by said engaging member while said engaging member is being received in said opening.

6. In a camera as set forth in claim 4, said operating means further comprising cooperating rotating means for rotating the film spool in said insert portion during said movement of the insert portion with said slide.

7. In a camera as set forth in claim 6, arresting means for preventing rotation of said film spool in said insert portion during a predetermined portion of said movement of the insert portion.

8. In a camera as set forth in claim 6, said rotating means including a rack member on said housing, a pinion member rotatable on said slide and meshing with said rack member, and coupling means for coupling said pinion member to said film spool.

9. In a camera as set forth in claim 8, said coupling means including means responsive to movement of said slide and of said insert portion away from the associated body portion for coupling the film spool in said insert portion to said pinion member.

10. In a camera as set forth in claim 4, said operating means including an operating element secured to said slide and accessible outside said housing for manual movement of said slide.

11. In a camera as set forth in claim 4, cooperating means on each cassette and in the associated receptacle for establishing a light sensitivity setting corresponding to the film received in the cassette, the camera further including automatic exposure control means, and means responsive to the position of said slide or alternatively transmitting said setting from either receptacle to said exposure control means.

12. In a camera as set forth in claim 4, framing means responsive to the movement of said slide for framing a portion of said film and holding the framed portion against said pressure plate while said slide is adjacent the receptacle receiving said other cassette, and for releasing said film while the film moves relative to said pressure plate.

13. In a camera as set forth in claim 12, said framing means including a plurality of framing members movable toward and away from said pressure plate, and means on said slide for moving said framing elements away from said pressure plate in response to movement of said slide.

14. In a camera as set forth in claim 13, said housing having a front wall carrying said objective lens and a back wall formed with an opening, said pressure plate being translucent and set in said opening for viewing of the projected image when said inserts are secured to the respective cassettes, said back wall carrying a hood movable toward and away from a position in which said hood seals said opening against entry of light into said housing.

15. A film cassette for use in a photographic camera comprising, in combination:

a. a body portion formed with an opening;
b. an insert portion having an open side and shaped for being received in said opening in a sealing position in which said insert portion seals said opening against entry of light into the interior of said body portion and said open side is in said interior and sealed against the entry of light into said insert portion; and
c. mounting means in each of said portions for mounting respective film spools for rotation about axes extending in a common direction when said insert portion is received in said opening,
  1. said body portion having a wall movable to give access to said interior for insertion of a film spool.

16. A cassette as set forth in claim 15, wherein said body portion has the approximate shape of a flat box having two wide side walls and narrow top, rear, front, and bottom walls, said movable wall being at least a portion of one of said side walls.

17. A cassette as set forth in claim 16, wherein said opening is formed in the other side wall.

18. A cassette as set forth in claim 15, further comprising locking means movable on said body portion toward and away from an operative position in which said locking means lock said insert portion in said sealing position, biasing means biasing said locking means toward said operative position, and releasing means accessible outside said interior for moving said locking means away from said operative position.

19. A cassette as set forth in claim 18, further comprising a guide member on the outside of said body portion and bounding a guide passage, said releasing means including a movable releasing member extending toward said passage.

20. A cassette as set forth in claim 15, indicia means movable on said insert portion and calibrated in numerical units, and means responsive to each cycle of movement of said insert portion into and out of said opening for advancing said indicia means by one unit.

* * * * *